Jan. 10, 1967  A. FENER  3,296,771
APPARATUS FOR HEAT SEALING AN OPEN END OF THERMOPLASTIC TUBES
Filed Oct. 7, 1964
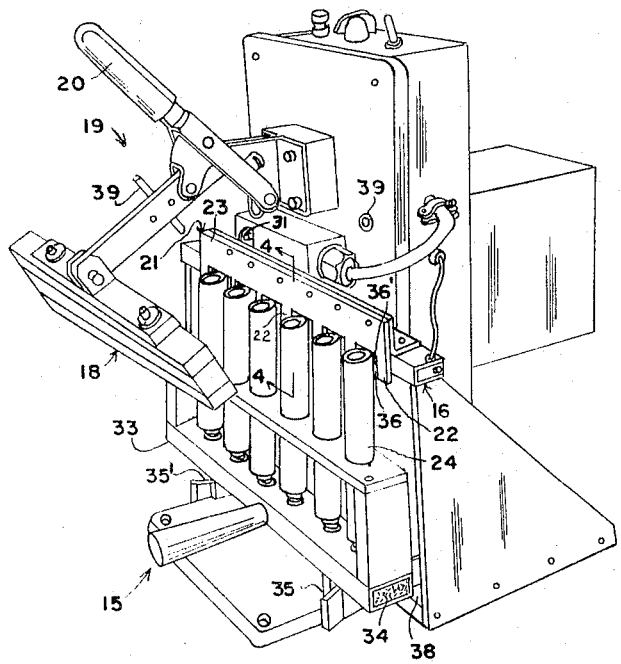
FIG.1
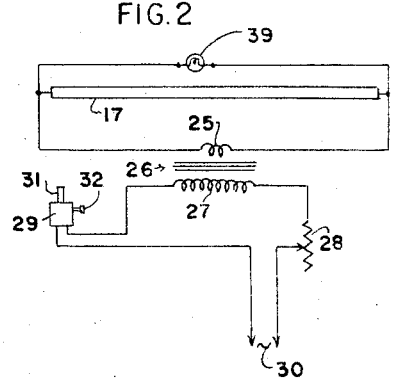
FIG.2
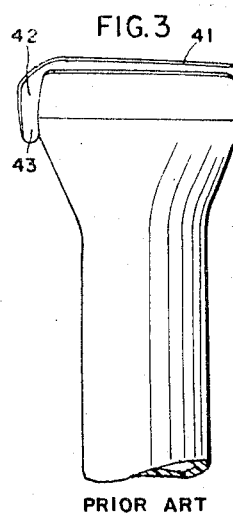
FIG.3 PRIOR ART
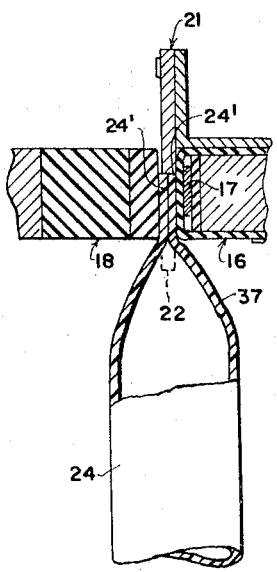
FIG.4
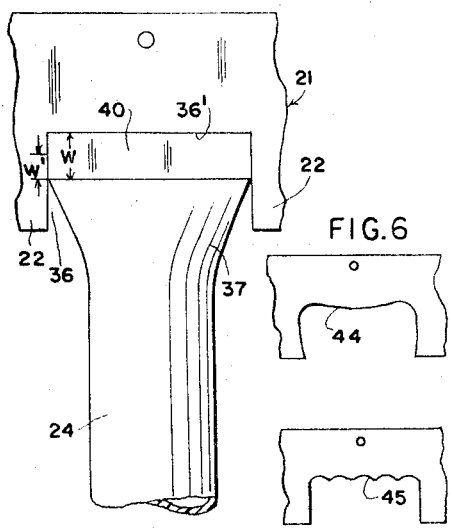
FIG.5
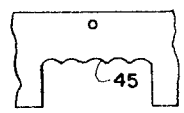
FIG.6
FIG.7
INVENTOR,
Alfred Fener,
BY
ATTORNEY.

United States Patent Office 3,296,771
Patented Jan. 10, 1967

3,296,771
APPARATUS FOR HEAT SEALING AN OPEN END OF THERMOPLASTIC TUBES
Alfred Fener, 422 Beach 146th St., Neponsit, N.Y. 11694
Filed Oct. 7, 1964, Ser. No. 402,279
12 Claims. (Cl. 53—373)

The present invention relates to an apparatus to close an end of thermoplastic tubes by flattening such ends into a fantail form and then heat sealing their contacting plies.

Heretofore, the edges of such junctures were not "clean" because drip tails and fins, commonly called "flash," formed therealong.

It is therefore the principal object of this invention to provide a novel and improved heat sealing apparatus to do this work and avoid said objectionable formations.

A further object thereof is to provide a novel and improved apparatus to close an end of thermoplastic tubes in the manner set forth, which in addition, if desired, will change all or any part of the normally straight edges of the fantail, into a decorative contour.

Still a further object of this invention is to provide a novel and improved apparatus of the character described, which is simple in construction, reasonable in cost, easy to use and efficient in carrying out the purposes for which it is designed.

Other objects and advantages will become apparent as this disclosure proceeds.

For one practice of this invention, I provide an apparatus in which a plurality of identical thermoplastic tubes are held upright in a movable rack and rest on a resilient member. It is the upper end of each of these tubes which is to be flattened into fantail form and then have the contacting portions of each fantail heat sealed. This laden tray is set so that the upper zones of said tubes are against a fixed horizontal sealing bar in back of them. A metal comb-form along the front of said sealing bar, has its teeth extending downwardly below the heating band carried in said bar. Each notch in said comb is of a size to nest the fantailed end of a tube and serves as a mold cavity therefor during the sealing operation; said comb also being the means which avoids the creation of drip tail and fin formations. It is to be noted that said resilient support biases the tubes upwardly to bear against the "floor wall" of the comb's notches they are respectively in. The thickness of the comb is a bit less than twice the wall thickness of a tube. In front of said tubes is a pressure bar which is movable towards the sealing bar. When so moved, said tube ends are flattened into fantail form, nest in said comb notches respectively and the contacting plies of each fantail is heat sealed. The walls of said notches may be straight or of a design contour. The heat is cut off before the pressure bar is returned to its normal rest position, to allow the junctures effected to set, whereupon the finished work is removed and the rack is ready to receive a new load to be worked on.

In the accompanying drawing forming part of this specification, similar characters of reference indicate corresponding parts in all the views.

FIG. 1 is a perspective view of a heat sealing apparatus of the thermal impulse type, embodying the teachings of this invention.

FIG. 2 is a wiring diagram of the heating system and its control.

FIG. 3 is an enlarged fragmentary perspective view of a thermoplastic tube, an end of which has been bent into a fantail form and its contacting plies heat sealed by means heretofore used for this purpose and in particular, this view shows the objectionable drip tails and fins formed along the edges of the sealed region, which flash the present invention avoids.

FIG. 4 is a fragmentary enlarged section taken at lines 4—4 in FIG. 1 during the sealing operation when the work is clamped between the pressure and sealing bars of the apparatus.

FIG. 5 is a fragmentary enlarged front view of the comb member showing how the tube end bent to close, nests in a notch of said comb, preparatory to and during the sealing operation; said notch serving as a mold for the work.

FIGS. 6 and 7 are fragmentary enlarged views of different shapes such notches may have as molds for the work so such perimetral shapes will be imparted to the work.

In the drawing, the numeral 15 designates generally a heat sealing apparatus of the thermal impulse type. In the specific embodiment illustrated, there is a fixed horizontal sealing bar indicated generally by the numeral 16 which includes a heating band 17 along the front thereof. Spaced forwardly from said sealing bar, is a pressure bar denoted generally by the numeral 18 which is movable towards and back away from said sealing bar, by any suitable means as for instance the toggle lever arrangement indicated generally by the numeral 19 which includes an operating lever 20. The components and materials therefor, suitable for sealing and pressure bar constructions and examples of thermal impulse sealing apparatus generally, are set forth in such patents as No. 2,796,913 to Fener and Langer, and my Patents Nos. 2,961,031 and 3,015,601. A metal comb-form 21, secured along the front of the sealing bar, has its teeth 22 extending downwardly and its back 23 extending upwardly from below or even with the plane of the upper longitudinal edge of the heating band 17; the distal ends of said teeth being below the lower longitudinal edge of said heating band. The width of said band 17 is at least equal to the width W of the region on the work, to be heat sealed. The thickness of the comb-form 21 is equal to or preferably a bit less than twice the wall thickness of a tube 24 to be worked on.

The terminals of the heating band 17 are connected across the secondary winding 25 of a step-down transformer 26. The primary winding 27 of said transformer in series with an adjustable rheostat 28 and a time delay switch 29, are connected as a group across the terminals of a source of alternating curernt 30. This time delay switch is of the type which is capable of closing an electric circuit upon its actuating plunger 31 being depressed and to automatically open such circuit a predetermined time delay period thereafter; the length of such time delay period being adjustable by means of the adjusting screw 32. This switch means is well known in the art and so no further showing or description thereof is necessary.

A supply of thermoplastic tubes 24 to be worked on, are arranged in a row in upright position on a rack 33, in which they stand on a resilient member 34. It is the upper ends of these tubes which are to be closed. The laden rack is guided by a track means 35, 35', to set thereon so that the top region of each tube 24 is in a notch 36 of the comb 21, pressing up against the central region of the floor wall 36' of the notch it is in and tangent against the sealing bar 16. The rack 33 is still capable of rearward movement, a distance equal to the outer radius of a tube, where it meets a stop, not shown, on the base 38 of the apparatus. The work so positioned, is illustrated in FIG. 1.

To operate the apparatus, the lever 20 is brought downwardly to move the pressure bar 18 into contact with the tubes 24, which of course are identical. Now, the tray 33 is moved rearwardly while the pressure bar movement is continued, so the contacting ply portions 24' of each fantail form effected, are in the general diametral plane of the tube they are part of. When the tube ends are tightly clamped by the cooperative action of the sealing and pressure bars, the rod 39 will have pushed the control plunger 31 of the timing switch 29, to start the heating cycle. While the circuit of the transformer 26 is closed, the band 17 will be heated and thereby effect the heat sealing of the plies 24' and a pilot lamp 39 which is preferably included in the secondary circuit of said transformer, will be lit. Upon the deactuation of the transformer by the working of the timing switch 29, current flow to said heating band 17 and said lamp 39 will cease. The darkening of the lamp serves as a signal for the operator to continue holding the work clamped for a few seconds longer so the weld sets, whereupon he shall bring the handle 20 upwards, then remove the tray 33, empty it and finally reload with a new set of tubes to be worked on.

The width of each notch 36 in the comb 21, is just sufficient for the flattened portion 40 of the fantail form to nest in and contact all three walls of the notch, preparatory to the application of the heat thereto. Such dimension is half the outer perimeter of the tube 24, plus a few thousandths of an inch clearance. Since the upper tube portions 24' which are in contact, are in a highly plastic state when heated by the band 17, the edges along them will conform to the shape of the notch they are in. Each notch, covered by the sealing and pressure bars 16, 18, serve as a mold cavity determining the final shape of its contents, hence the formation of fins like 41, 42 will be avoided. Of importance to note is that the lower portions of the comb's teeth 22, which are spaced from the fantail form 37, will act as cooling fins which quickly dissipate the heat and keep the edge regions W' of the plies 24' in a comparatively low plastic state which actually avoids drip and so there is no formation of drip tails like 43. It is evident that when the notches present wall edges for example as shown at 44 and 45 which are of decorative contours, such contours will be imparted to the work.

The comb 21 is a flat element with as many notches 36 in its bottom edge as is required for the number of tubes 24, the apparatus is designed for, to receive as one load. Though I have shown the tubes as having a circular cross section, they may be of oval or other shaped cross sections, provided they are similarly carried by the rack, which as well as that the pressure bar 18 may include a heater band directly opposite to and identical with the band 17, are believed readily understood by those versed in the art, without the necessity of any further illustration.

It is evident that this apparatus may be mounted for operation in any position and may be designed for any position required. If built to work on only one tube 24 at a time, the comb-form would have but two teeth, which in essence would constitute an element having a notch 36 into which a tube in hand is placed as shown herein, and held there while with the other hand, the operator shall work the handle 20.

This invention is capable of numerous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific showing and description herein, to indicate the scope of this invention.

I claim:

1. In a heat sealing apparatus of the thermal impulse type comprising, in combination, sealing and pressure bars positioned opposite each other and mounted for relative movement towards and away from each other; said sealing bar including a sealing band facing the pressure bar, adapted to be heated by passing a pulse of current therethrough, means for relatively moving said bars to apply pressure on one end region of a thermoplastic tube positioned between them whereby said tube end is closed and made to assume a fantail form contacting ply portions, a substantially flat element positioned between said bars; said element having a notch which has opposite walls and an intermediate floor wall; the contacting ply portions of said fantail form being adapted to enter said notch, fit therein and contact said floor wall; said sealing band extending along said contacting ply portions across the tube when said ply portions are entered in said notch; said bars and notched element when holding said ply portions, forming a mold cavity therefor, and switching means operable in timed relation with said bar moving means, for passing a pulse of current through said sealing band whereby said contacting ply portions will be made to conform to said mold cavity and be sealed together.

2. An apparatus as defined in claim 1, wherein said element is heat-conductive; the notched edge of said element extending beyond said sealing band when the contacting ply portions of the fantail form are entered into said notch.

3. An apparatus as defined in claim 1, wherein said sealing bar is fixed and said notched element is mounted thereon.

4. An apparatus as defined in claim 1, wherein the thickness of said notched element is less than and nearly equal to twice the thickness of the wall of the tube.

5. An apparatus as defined in claim 1, including a resilient element for the other end of the tube to rest against; said resilient element being adapted to bias a tube bearing thereon, whereby the end of the tube to be closed, will bear against the floor wall of the notch before said bars are brought together to clamp the tube.

6. An apparatus as defined in claim 5, including a separate rack for supporting a tube; said resilient element being carried on said rack.

7. An apparatus as defined in claim 1, wherein any part of the walls of the notch is of decorative contour.

8. An apparatus as defined in claim 1, wherein said notched element is a comb-form; said sealing band extending across the teeth of said comb-form when said bars are brought towards each other whereby a plurality of tubes can be worked on simultaneously; each notch of said comb-form accommodating a tube.

9. An apparatus as defined in claim 8, wherein said comb-form is heat-conductive; the distal ends of the teeth of said comb-form extending beyond said sealing band when the contacting ply portions of a fantail form are entered in the notch formed by the space between two successive teeth of said comb-form.

10. An apparatus as defined in claim 8, including resilient means for the other ends of the tubes to rest against; said resilient means being adapted to bias tubes bearing thereon whereby each tube will bear against the floor wall of the notch it is in, before said bars are brought together to clamp the tubes.

11. An apparatus as defined in claim 10, including a separate rack for supporting a plurality of tubes spaced to enter the notches in the comb-form respectively; said resilient means being carried on said rack.

12. An apparatus as defined in claim 1, wherein said notched element is a comb-form; said sealing band extending across the teeth of said comb-form when said bars are brought towards each other whereby a plurality of tubes can be worked on simultaneously; each notch of said comb-form accommodating a tube; any part of the walls of each notch being of decorative contour.

References Cited by the Examiner

UNITED STATES PATENTS

| | | | |
|---|---|---|---|
| 2,926,474 | 3/1960 | Morrison et al. | 53—373 |
| 2,935,831 | 5/1960 | Saumsiegle | 53—373 |

TRAVIS S. McGEHEE, *Primary Examiner.*